Patented Feb. 7, 1939

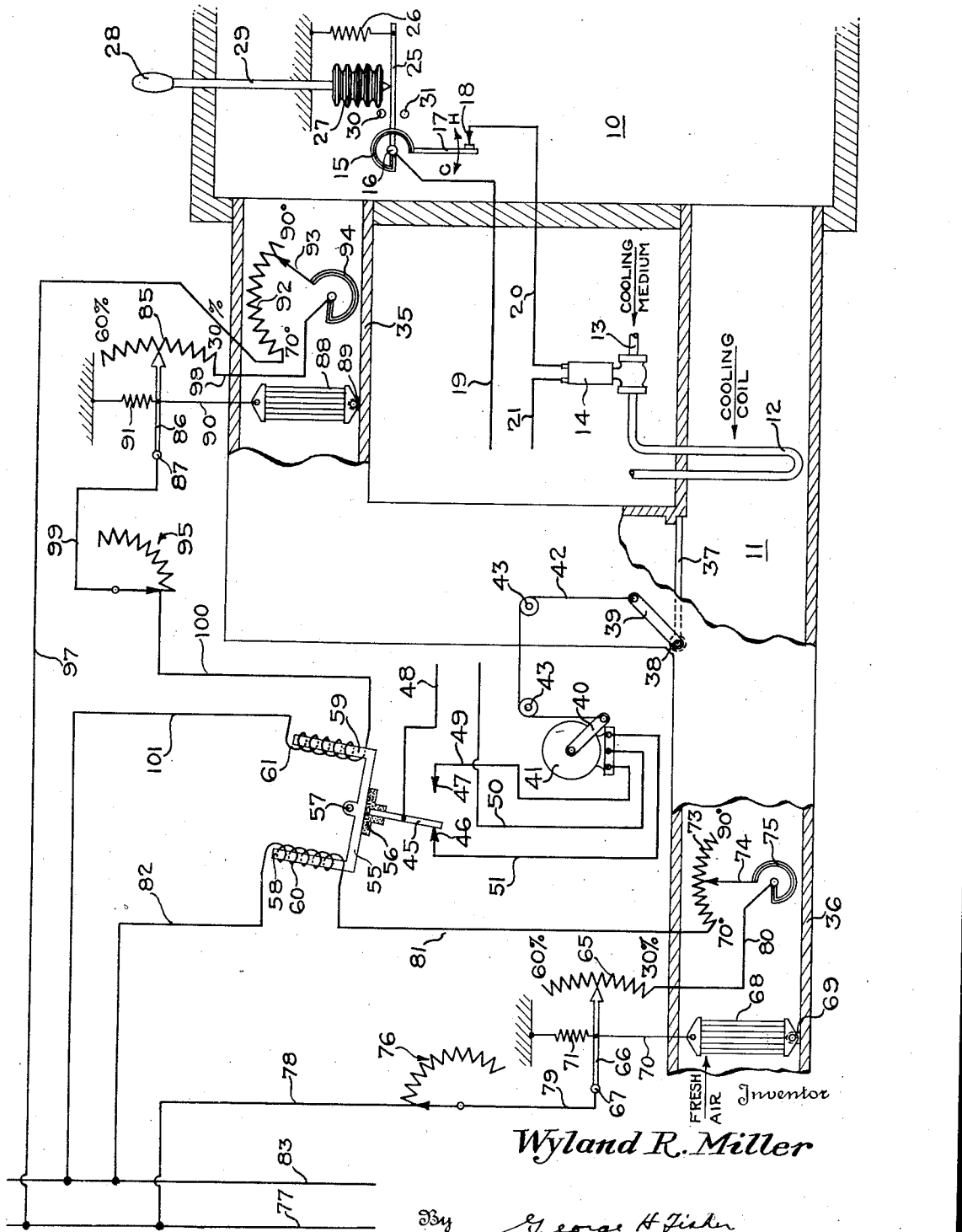

2,146,127

UNITED STATES PATENT OFFICE 2,146,127

AIR CONDITIONING SYSTEM

Wayland R. Miller, Chicago, Ill., assignor to Minneapolis-Honeywell Regulator Company, Minneapolis, Minn., a corporation of Delaware Application August 23, 1935, Serial No. 37,471

3 Claims. (Cl. 236—44)

The present invention relates to a new method and apparatus for controlling air conditioning systems and its underlying object is the provision of a method and apparatus for controlling air conditioners in an economical manner.

The present invention contemplates changing or varying the relative amounts of indoor and outdoor or return and fresh air, that are delivered to an air conditioner for conditioning, according to whether the fresh or outdoor air, or the return or indoor air, requires the least conditioning. It will be readily apparent that under certain conditions wherein an enclosure, such as an auditorium or the like, is suddenly filled with people, the temperature and/or humidity thereof may suddenly rise considerably above the temperature and/or humidity of the outdoor air. Under these conditions, it would be more economical to use all or more outdoor air than indoor air. Similarly, in the evening or under other conditions, it often happens that the outdoor air temperature decreases while the enclosure is still relatively warm. Under these conditions, it again would be more economical to use all outdoor air or to use more outdoor air than indoor air for conditioning purposes. On the other hand, it will often be the case that the indoor conditions are such that the indoor or return air will require less conditioning than would the outdoor or fresh air. Under such circumstances, it is more economical to utilize all indoor or return air or to utilize more indoor or return air than outdoor or fresh air.

An object of the invention, therefore, is the provision of a novel control system for an air conditioner wherein the relative amounts of indoor and outdoor air supplied to the air conditioner are changed or varied depending upon whether the indoor air or the outdoor air requires the least conditioning.

A more specific object of the invention is the positioning of a damper, which determines the proportions of indoor and outdoor air supplied to an air conditioner, in such position that more outdoor air is supplied thereto when the relative conditions of the indoor and outdoor air are such that the outdoor air requires less conditioning than the indoor air.

A further object of the invention is the provision of an air conditioning system wherein means responsive to the conditions within an enclosure and outside thereof not only control the conditioner to maintain desired conditions within the enclosure but also control damper means in such manner as to supply less air from the enclosure and more fresh outdoor air to the conditioner when the relative conditions between the fresh outdoor air and the air within the enclosure are such that the fresh outdoor air requires less conditioning than the air within the enclosure.

A further object of the invention is the provision of a new and novel method of controlling an air conditioner in such manner that the amounts of return air and outdoor air supplied thereto are varied or increased and decreased in accordance with the relative conditions of the return air and outdoor air in respect to the amount of conditioning required.

Further object of the invention will become apparent from an inspection of the drawing, the detailed description, and the appended claims.

For a more complete understanding of the invention, reference may be had to the following detailed description and the accompanying single drawing which is a schematic showing of one form which the present invention may take.

Referring to the single drawing, a space or enclosure to be conditioned is indicated at 10. An air conditioner, herein shown in the form of an air conditioning chamber 11, is associated with the space or enclosure 10 for the purpose of conditioning the air delivered thereto. The air passing through the air conditioning chamber 11 is herein shown as conditioned by means of a cooling coil 12 which is supplied with a cooling medium from any suitable source, as indicated by the pipe 13, and under the control of an electrically operated valve 14. It is to be understood that this illustration of a cooling coil 12 for the purpose of conditioning the air passing through the air conditioning chamber 11 is illustrative only and that it is immaterial insofar as the present invention is concerned what type of apparatus is utilized for conditioning the air which is delivered to the space or enclosure 10.

In the form of the invention shown herein, the electrically operated valve 14 is controlled by a thermostat that includes a bimetallic actuating element 15. One end of this element 15 is secured to a post 16 and the other end thereof controls the movements of a contact arm 17. This contact arm 17 cooperates with a contact 18 for the purpose of completing and interrupting a circuit to the electrically operated valve 14. The circuit for this valve 14 is as follows: line wire 19, post 16, bimetallic element 15, contact arm 17, contact 18, wire 20, electrically operated valve 14, and line wire 21.

If it is desired to vary the temperature within the enclosure 10 in relation to temperature variations outside the enclosure, this can easily be accomplished by securing the post 16 to a pivoted arm 25. This pivoted arm 25 is biased in one direction by a suitable spring 26 and is adapted to be moved in the other direction by an outdoor temperature responsive thermostat comprising a bellows 27, a controlling bulb 28 and an interconnecting tube 29.

It will be readily seen upon an inspection of the drawing that an increase in outdoor temperature causes expansion of bellows 27 against the biasing action of spring 26 so that contact arm 17 is moved in a direction away from the contact 18. A higher temperature is therefore required in the enclosure 10 before the contact arm 17 engages the contact 18 to energize the electrically operated valve 14 and permit the flow of cooling fluid to the cooling coil 12. On the other hand, a decrease in the outdoor temperature results in a contraction of the bellows 27 under the action of the biasing spring 26 so that contact arm 17 is moved towards the contact 18 whereby a lower temperature is maintained within the enclosure 10. If desired, suitable stops 30 and 31 may be provided to limit the adjustment of the contact arm 17 by the bellows 27 so that adjustment of the indoor thermostat only takes place throughout a predetermined range of outdoor temperature. This adjustment of the indoor thermostat by the outdoor thermostat may be such as to maintain a predetermined constant differential between the indoors and outdoors except as limited by the stops 30 and 31, or may be arranged so that a variable differential is maintained between these temperatures.

As in the case of the cooling coil 12, the manner in which the air conditioner 11 is controlled is immaterial insofar as the broader aspects of the present invention are concerned. The control of the cooling coil valve 14 could well be by the indoor temperature alone or by any other condition within the enclosure 10 and, in turn, such a controller could likewise be influenced in its operation in response to any desired change in outdoor conditions.

Air is delivered to the air conditioning chamber 11 by means of a return air duct 35 and a fresh air duct 36. The relative amounts of fresh air and return air delivered to the air conditioning chamber 11 are determined by the position of a damper 37. This damper 37 is herein shown as mounted upon a shaft 38 which is further provided with a crank arm 39. This crank arm 39 is connected to the crank arm 40 of a suitable electric motor means 41 by means of a cable 42 and pulleys 43. With the parts in the position shown, all fresh air is being delivered to the air conditioning chamber 11 and no return air is being delivered thereto. If the damper 37 is actuated through 90 angular degrees in a clockwise direction, then all return air is delivered to the air conditioning chamber 11 and no fresh air is delivered thereto. For any intermediate position of the damper 37, corresponding proportions of fresh and return air are delivered to this air conditioning chamber 11. It will be understood that a suitable blower may be utilized to induce the flow of air through the conditioner, enclosure, and associated ducts.

The controlling motor 41 for the damper 37 is herein shown as of the type that is controlled by a double-circuit switching mechanism. This double-circuit switching mechanism comprises a contact arm 45 and a cooperating pair of contacts 46 and 47 which are alternately engaged thereby upon oscillation thereof. With the parts in the position shown, the contact arm 45 is engaging the contact 46 and the damper 37 has completely closed off the supply of return air to the air conditioning chamber 11. If the contact arm 45 should now be moved into engagement with the contact 47, a circuit as follows is completed to the motor 41: line wire 48, contact arm 45, contact 47, wire 49, motor 41, and line wire 50. The motor 41 thereupon rotates its crank 40 in a counter-clockwise direction thereby permitting movement of damper 37 in a clockwise direction whereby the amount of fresh air delivered to the air conditioning chamber 11 is reduced and the amount of return air delivered thereto is increased. This motor 41 may be of any of the well-known types usual in the art and particularly may be of the type which moves to a definite given position upon closure of a circuit thereto or of the type which moves in a certain direction so long as such circuit is completed thereto. In the former case, the damper 37 is operated between one of two positions wherein either all of the return air or all of the fresh air is prevented from entering the air conditioning chamber 11. In the latter case, the proportions of return air and fresh air are minutely varied. If the contact arm 45 should now be moved back into engagement with contact 46, a circuit for motor 41 is established as follows: line wire 48, contact arm 45, contact 46, wire 51, motor 41, and line wire 50. The crank arm 40 now revolves in a clockwise direction and the damper 37 is moved in a counter-clockwise direction so as to increase the amount of fresh air and reduce the amount of return air delivered to the air conditioning chamber 11.

This switching mechanism, which is comprised by the switch arm 45 and cooperating contacts 46 and 47, may be controlled in accordance with the relative indoor and outdoor conditions in any desirable manner. The contact arm 45 is herein shown as connected to the armature 55 of an electro-magnetic relay through the medium of a piece of insulating material 56. This armature 55 is pivoted as indicated at 57 and is provided with a pair of legs 58 and 59 with which electromagnetic windings 60 and 61, respectively, cooperate. Energization of electromagnetic winding 60 is controlled in accordance with the conditions of the outside atmosphere, whereas energization of the electromagnetic winding 61 is controlled in accordance with variations in the atmosphere within the enclosure 10.

Energization of the electromagnetic coil 60 is controlled by resistance means responsive to outdoor conditions. This resistance means takes the form of two separate variable resistance controllers, one responsive to outdoor relative humidity and the other responsive to outdoor dry bulb temperature. The outdoor relative humidity variable resistance controller includes a variable resistance 65 and a cooperating contact arm 66 which is pivoted at 67. A relative humidity responsive element, herein shown as positioned in the fresh air inlet duct 36, takes the form of a plurality of strands of human hair 68 which have one of their ends secured, as by a cable 69 while the other ends thereof are connected to the contact arm 66, as by a cable 70. A suitable tension spring 71 serves to maintain the humidity responsive element 68 taut and to place the proper tension thereon. It will be evident that upon an increase in the relative humidity of the outdoor fresh air, the element 68 will expand whereupon the spring 71 will move the contact arm 66 upwardly along the resistance 65. Similarly, upon a decrease in the relative humidity of the outdoor air, the element 68 will contract whereupon the contact arm 66 will be moved downwardly along resistance 65.

The outdoor dry-bulb temperature responsive resistance controller comprises a resistance 73 and a cooperating contact arm 74 which is controlled by a bimetallic element 75 disposed within the fresh air inlet duct 36.

These two resistance elements 65 and 73, in series, control the energization of electromagnetic coil 60. If desired, a manually operable rheostat 76 may also be provided for additionally controlling the energization of electromagnetic coil 60. The circuit for electromagnetic coil 60 is then as follows: line wire 77, wire 78, rheostat 76, wire 79, contact arm 66, resistance 65, wire 80, bimetallic element 75, resistance 73, wire 81, electromagnetic coil 60 and wire 82 to line wire 83.

Similarly, electromagnetic coil 61 is controlled by resistance means comprising an indoor or return air dry-bulb temperature responsive controller of the variable resistance type and an indoor or return air relative humidity responsive controller of the variable resistance type. The indoor relative humidity responsive controller includes a resistance 85 and a cooperating contact arm 86 which is pivoted at 87. The relative humidity responsive element comprises a plurality of strands of human hair 88 which have one of their ends secured as indicated at 89 whereas the other ends thereof are connected to the contact arm 86 as indicated at 90. A suitable spring 91 serves to place the relative humidity responsive element 88 under the proper bias or tension.

The indoor or return air responsive resistance controller comprises a resistance 92, a cooperating contact arm 93 and a controlling bimetallic element 94.

These two variable resistances 85 and 92, in series, control the energization of electromagnetic coil 61, a rheostat 95 being included in the circuit, if desired, for adjustment purposes. The circuit for electromagnetic coil 61 is therefore as follows: line wire 77, wire 97, resistance 92, contact arm 93, bimetallic element 94, wire 98, resistance 85, contact arm 86, wire 99, rheostat 95, wire 100, electromagnetic coil 61 and wire 101 to line wire 83.

It will now be evident that if the outdoor conditions are such that electromagnetic coil 60 is energized more highly than electromagnetic coil 61, then the switch arm 45 will move to the position shown wherein it engages contact 46. On the other hand, if the indoor conditions are such in respect to the outdoor conditions that electromagnetic coil 61 is energized more highly than electromagnetic coil 60, then switch arm 45 will move into engagement with contact 47.

Operation

Assuming that the range of both the indoor and outdoor relative humidity responsive controllers is from 30% to 60% and the range of the indoor and outdoor dry bulb temperature responsive controllers is from 70° to 90° F., as indicated on the drawing, then with the parts in the position shown, the indoor and outdoor relative humidities are both substantially 45%, while the outdoor dry bulb temperature is substantially 80° and the indoor dry bulb temperature is substantially 90°. Under these conditions, electromagnetic coil 60 is more highly energized than electromagnetic coil 61 since about equal amounts of the resistances 65 and 85 are respectively in circuit with the electromagnetic coils 60 and 61 whereas only a portion of the resistance 73 is in circuit with the electromagnetic coil 60 and all, or substantially all, of the resistance 92 is in circuit with electromagnetic coil 61. As a result, contact arm 45 is engaged with contact 46, as shown, and the damper 37 is in such position that all fresh air is being delivered to the air conditioning chamber 11. It will be evident that it is more economical to condition the fresh air than the return air under this set of conditions since, while their relative humidities are equal, the indoor air temperature is substantially higher than the outdoor air temperature. Now, if either the outdoor relative humidity or the outdoor dry bulb temperature should increase, or if either the indoor relative humidity or the indoor dry bulb temperature should decrease, or if any of these things happen, the energization of electromagnetic coil 60 will decrease and the energization of electromagnetic coil 61 will increase. When the energization of electromagnetic coil 61 becomes higher than that of electromagnetic coil 60, then contact arm 45 will engage contact 47 to cause movement of damper 37 in a clockwise direction. This movement will either be a complete movement to a vertical position or a partial movement depending upon the type of motor 41 employed.

With the temperature of the enclosure at 90°, the contact arm 17 is engaging the contact 18 so that cooling coil valve 14 is open and a cooling action is taking place in the enclosure. This will gradually cause a reduction in the enclosure temperature. As explained above, when this enclosure temperature has been reduced sufficiently, the contact arm 45 will engage contact 47 to cause movement of damper 37 towards the position in which some or all return air is utilized and less or no fresh air.

Now if a large group of people should enter the enclosure 10, the relative humidity thereof will undoubtedly rise. This rise in relative humidity may well be sufficient to cause all of the resistance 85 to be placed in circuit with electromagnetic coil 61. Under these conditions, if the outdoor temperature and relative humidity are not too high, electromagnetic coil 60 will again become more highly energized than electromagnetic coil 61 so that the amount of fresh air furnished to the air conditioner 11 will be increased and the amount of return air furnished thereto will be decreased. This operation is desirable since by reason of the influx of people into enclosure 10, the outdoor air is now, at least temporarily, more economical to condition than the indoor air.

It will readily be appreciated how the relative conditions between the indoor air and outdoor air can fluctuate under various conditions of operation and occupancy and it will be clear that the system of the present invention operates to utilize indoor or outdoor air, depending upon which requires the least conditioning.

The rheostats 76 and 95 may be utilized for initial adjustment or they may singly be utilized to provide a bias, as it were, so that either more outdoor air or more indoor air will be admitted to the conditioner 11 even when the conditions of both the indoor and outdoor air are equal, insofar as the amount of conditioning required is concerned. For example, it might be desirable to include a part of the resistance of rheostat 95 in circuit with the electromagnetic coil 61 so that more or all fresh air would be utilized in the case the fresh air and outdoor air required equal conditioning or substantially equal conditioning. This for the reason that it would probably be better to utilize fresh air than return air so long as substantially the same amount of conditioning is required in either case.

As is well known, even when the damper 37 is in position to prevent flow of indoor or outdoor air to the conditioning chamber 11, there is sufficient leakage therearound to enable the controllers located in the fresh air duct 36 and return air duct 35 to properly respond to the desired conditions.

While the invention has been shown as applied to a system wherein both outdoor relative humidity and dry bulb temperature and both indoor relative humidity and dry bulb temperature—i. e., outdoor and indoor effective temperature—are utilized for the comparison to determine whether outdoor air or indoor air should be supplied to the air conditioning chamber 11, it will readily be appreciated that any other desired comparison of indoor or outdoor conditions could be made the basis for the selection of the indoor and outdoor air. Further, it will be evident, that many changes can be made in the details of the present invention without departing from the spirit thereof and I am therefore to be limited only in view of the appended claims.

I claim:

1. An air conditioning system for an enclosure, comprising, in combination, air conditioning means, damper means controlling the supply of fresh air and return air to be delivered to said air conditioning means, means for operating said damper means, including oppositely acting magnetic means, variable resistance means in circuit with one of said magnetic means, means responsive to the condition of the fresh air for varying said resistance means, variable resistance means in circuit with the other of said magnetic means, and means responsive to the condition of the fresh air for varying said last mentioned resistance means, the arrangement being such that when the fresh air needs less conditioning than the return air the damper means is operated to admit more fresh air and when the return air needs less conditioning than the fresh air the damper means is operated to admit more return air.

2. An air conditioning system for an enclosure, comprising, in combination, air conditioning means, damper means controlling the supply of fresh air and return air to be delivered to said air conditioning means, a pair of opposed magnetic devices, switching means controlled thereby, motor means in control of said damper means controlled by said switching means, variable resistance means in control of the energization of one of said magnetic devices, means controlled by the condition of the air in said enclosure for adjusting said variable resistance means, variable resistance means in control of the energization of the other of said devices, and means controlled by the condition of the fresh air for adjusting said last mentioned variable resistance means.

3. An air conditioning system for an enclosure, comprising, in combination, air conditioning means for conditioning air to be delivered to the enclosure for maintaining the condition of the air in the enclosure at desired values, damper means controlling the supply of fresh air and return air to be delivered to the air conditioning means for conditioning thereby, electric motor means for operating said damper means, first variable resistance means, means responsive to the condition of the fresh air for varying said first resistance means, second variable resistance means, means responsive to the condition of the return air for varying said second resistance means, and means for connecting said variable resistance means with said electric motor means to operate the damper means to admit more fresh air when the fresh air needs less conditioning than the return air and to admit more return air when the return air needs less conditioning than the fresh air.

4. An air conditioning system for an enclosure, comprising in combination, air conditioning means for conditioning air to be delivered to the enclosure for maintaining the condition of the air in the enclosure at desired values, damper means controlling the supply of fresh air and return air to be delivered to the air conditioning means for conditioning thereby, electric motor means for operating said damper means, means including oppositely acting electrical means for controlling the operation of said electric motor means, first variable resistance means, means responsive to the condition of the fresh air for varying said first resistance means, second variable resistance means, means responsive to the condition of the return air for varying said second resistance means, and means for connecting said variable resistance means with said oppositely acting electrical means to operate the damper means to admit more fresh air when the fresh air needs less conditioning than the return air and to admit more return air when the return air needs less conditioning than the fresh air.

5. An air conditioning system for an enclosure, comprising, in combination, air conditioning means for conditioning air to be delivered to the enclosure for maintaining the condition of the air in the enclosure at desired values, damper means controlling the supply of fresh air and return air to be delivered to the air conditioning means for conditioning thereby, electric motor means for operating said damper means, first variable resistance means, means responsive to the dry bulb temperature of the fresh air for varying said first resistance means, second variable resistance means, means responsive to the relative humidity of the fresh air for varying said second resistance means, and means including means for connecting said variable resistance means to said electric motor means to operate said damper means to decrease the supply of fresh air when the cumulative effect of the dry bulb temperature and relative humidity increases to a value indicating that the fresh air needs more conditioning than the return air.

6. An air conditioning system for an enclosure, comprising, in combination, air conditioning means for conditioning air to be delivered to the enclosure for maintaining the condition of the air in the enclosure at desired values, damper means controlling the supply of fresh air and return air to be delivered to the air conditioning means for conditioning thereby, electric motor means for operating said damper means, first variable resistance means, means responsive to the dry bulb temperature and the relative humidity of the fresh air for varying said first resistance means, second variable resistance means, means responsive to the dry bulb temperature and the relative humidity of the return air for varying said second resistance means, and means for connecting said variable resistance means with said electric motor means to operate the damper means to admit more fresh air when the cumulative effects of the dry bulb temperature and relative humidity of the fresh air and of the return air indicate that the fresh air needs less conditioning than the return air and to admit more return air when the cumulative effects of the dry bulb temperature and the relative humidity of the fresh air and of return air indicate that the return air needs less conditioning than the fresh air.

7. An air conditioning system for an enclosure, comprising, in combination, air conditioning means for conditioning air to be delivered to the enclosure for maintaining the condition of the air in the enclosure at desired values, damper means controlling the supply of fresh air and return air to be delivered to the air conditioning means for conditioning thereby, means for operating said damper means, first control means operated in accordance with the dry bulb temperature of the fresh air, second control means operated in accordance with the relative humidity of the fresh air, and means controlled by both of said control means to operate said damper operating means to decrease the supply of fresh air when the cumulative effect of the dry bulb temperature and relative humidity increases to a value indicating that the fresh air needs more conditioning than the return air.

8. An air conditioning system for an enclosure, comprising, in combination, air conditioning means for conditioning air to be delivered to the enclosure for maintaining the condition of the air in the enclosure at desired values, damper means controlling the supply of fresh air and return air to be delivered to the air conditioning means for conditioning thereby, means for operating said damper means, first control means operated in accordance with the dry bulb temperature of the fresh air, second control means operated in accordance with the relative humidity of the fresh air, third control means operated in accordance with the dry bulb temperature of the return air, fourth control means operated in accordance with the relative humidity of the return air, and means controlled by all of said control means to operate said damper operating means to admit more fresh air when the cumulative effects of the dry bulb temperature and relative humidity of the fresh air and of the return air indicate that the fresh air needs less conditioning than the return air and to admit more return air when the cumulative effects of the dry bulb temperature and the relative humidity of the fresh air and of the return air indicate that the return air needs less conditioning than the fresh air.

WAYLAND R. MILLER.